United States Patent [19]
Cody et al.

[11] Patent Number: 4,929,795
[45] Date of Patent: May 29, 1990

[54] METHOD FOR ISOMERIZING WAX TO LUBE BASE OILS USING AN ISOMERIZATION CATALYST

[75] Inventors: Ian A. Cody, Clearwater, Canada; Glen P. Hamner, deceased, late of Baton Rouge, by Annabelle Hamner, executrix; James T. Schorfheide, Baton Rouge, both of La.

[73] Assignee: Exxon Research and Engineering Company, Florham Park, N.J.

[21] Appl. No.: 283,665

[22] Filed: Dec. 13, 1988

Related U.S. Application Data

[63] Continuation-in-part of Ser. No. 134,952, Dec. 8, 1987, abandoned.

[51] Int. Cl.$^5$ .............................................. C07C 15/13
[52] U.S. Cl. .................................... 585/739; 585/749; 585/751
[58] Field of Search .................... 585/739, 749, 751

[56] References Cited

U.S. PATENT DOCUMENTS

| | | | |
|---|---|---|---|
| 2,668,790 | 2/1954 | Good et al. | 196/50 |
| 2,668,866 | 2/1954 | Good et al. | 260/683.5 |
| 2,817,693 | 12/1957 | Koome et al. | 260/683.5 |
| 2,838,444 | 6/1958 | Teter et al. | 196/50 |
| 3,078,323 | 2/1963 | Kline et al. | 260/683.65 |
| 3,123,573 | 3/1964 | Carr | 252/442 |
| 3,125,511 | 3/1964 | Tupman et al. | 208/264 |
| 3,206,525 | 9/1965 | Michaels et al. | 260/683.66 |
| 3,268,439 | 8/1966 | Tupman et al. | 208/112 |
| 3,308,052 | 3/1967 | Ireland et al. | 208/27 |
| 3,365,390 | 1/1968 | Egan et al. | 208/60 |
| 3,487,005 | 12/1969 | Egan et al. | 208/59 |
| 3,684,695 | 8/1972 | Neel et al. | 208/110 |
| 3,709,817 | 1/1973 | Suggitt et al. | 208/112 |
| 3,711,399 | 1/1973 | Estes et al. | 208/112 |
| 3,794,580 | 2/1974 | Ladeur | 208/110 |
| 3,830,723 | 8/1974 | Ladeur et al. | 208/103 |
| 3,843,746 | 10/1974 | Kravitz et al. | 260/683.68 |
| 3,864,425 | 2/1975 | Gardner | 260/683.68 |
| 3,915,843 | 10/1975 | Franck et al. | 208/112 |
| 3,963,601 | 6/1976 | Hilfman | 208/111 |
| 3,976,560 | 8/1976 | Erickson et al. | 208/138 |
| 4,427,791 | 1/1984 | Miale et al. | 502/203 |
| 4,472,529 | 9/1984 | Johnson et al. | 502/228 |
| 4,588,701 | 5/1986 | Chiang et al. | 502/65 |

FOREIGN PATENT DOCUMENTS

| | | |
|---|---|---|
| 275062 | 7/1964 | Australia . |
| 539698 | 4/1957 | Canada . |
| 700237 | 12/1964 | Canada . |
| 227888 | 10/1985 | German Democratic Rep. . |
| 823010 | 11/1959 | United Kingdom . |
| 848198 | 9/1960 | United Kingdom . |
| 953188 | 3/1964 | United Kingdom . |
| 953189 | 3/1964 | United Kingdom . |
| 1065205 | 4/1967 | United Kingdom . |
| 1342499 | 1/1974 | United Kingdom . |
| 1342500 | 1/1974 | United Kingdom . |
| 1440230 | 6/1976 | United Kingdom . |
| 1493928 | 11/1977 | United Kingdom . |

*Primary Examiner*—Patrick P. Garvin
*Assistant Examiner*—E. D. Irzinski
*Attorney, Agent, or Firm*—Joseph J. Allocca

[57] ABSTRACT

A process is disclosed for the production of lube oil base stocks or blending stocks by the isomerization of waxes over isomerization catalysts containing a hydrogenating metal component on a fluorided alumina or material containing alumina.

The present invention is also directed to a wax isomerization process which process employs a catalyst prepared by a process involving depositing a hydrogenation metal on alumina or material containing alumina support, calcining said metal loaded support and fluoriding said metal loaded support.

12 Claims, No Drawings

METHOD FOR ISOMERIZING WAX TO LUBE BASE OILS USING AN ISOMERIZATION CATALYST

CROSS REFERENCE TO RELATED APPLICATIONS

This application is a continuation-in-part application of Ser. No. 134,952, filed Dec. 18, 1987, now abandoned.

DESCRIPTION OF THE INVENTION

A process is disclosed of the production of high yields of non-conventional lube oil base stocks or blending stocks of very low pour point, pour point of about −21° C., preferably −24° C., most preferably −27° C., and a very high viscosity index (VI), VI's of about 130, preferably 135 and higher by the isomerization of waxes over isomerization catalysts containing a hydrogenating metal component typically one or a mixture from Group VIII, preferably noble Group VIII, most preferably platinum on a fluorided alumina or material containing alumina support, wherein said catalyst in its (as introduced to waxy feed) form is characterized by possessing (1) a hydrate level of 60 or less, preferably between 10 to 60 determined as the relative amount of hydrate represented by a peak in the X-ray diffraction (XRD) pattern at $2\theta = 5.66$ Å when a hydrate level of 100 corresponds to the XRD peak height exhibited by a standard material constituting 0.6 wt% Pt on 150 $m^2/g$ $\gamma$ alumina containing 7.2 wt% F wherein the fluorine has been deposited using an aqueous solution containing a high concentration of HF, i.e. 10 wt% and greater, preferably 10 to 15 wt% HF and the material dried at 150° C. for 16 hrs; (2) a surface nitrogen content N/Al ratio of about 0.01 or less, preferably 0.007 or less, most preferably 0.004 or less as determined by X-ray photo electron spectroscopy (XPS); (3) a bulk fluorine concentration of between 2 to 10 wt%, preferably between 5 to 8 wt% and (4) a surface fluorine concentration defined as the amount of fluorine present in a layer between the surface of the catalyst particle to a depth of about 1/100 of an inch of less than about 3 wt%, preferably less than about 1 wt; most preferably less than about 0.5 wt% provided that the surface fluoride concentration is less than the bulk fluoride concentration.

The fluoride content of the catalyst can be determined in a number of ways.

One technique analyzes the fluorided catalysts using oxygen combustion methodology which is well established in the literature. Approximately 8–10 mgs of sample is mixed with 0.1 g benzoic acid and 1.2 gms of mineral oil in a stainless steel combustion capsule which is mounted in a 300 mL. Parr oxygen combustion bomb. The "sample" is purged of air and subsequently combusted under 30 Atms of pure oxygen. Combustion products are collected in 5 mL. of deionized water. Once the reaction has gone to completion (about 15 minutes), the absorbing solution is quantitatively transferred and made to fixed volume.

Fluoride concentration of the sample is determined by ion chromatography analysis of the combustion product solution. Calibration curves are prepared by combusting several concentrations of ethanolic KF standards (in the same manner as the sample) to obtain a 0–10 ppm calibration range. Fluoride concentration of the catalyst is calculated on an ignition-loss-free-basis by comparison of the sample solution response to that of the calibration curve. Ignition loss is determined on a separate sample heated to 800 degrees F. for at least 2 hours. Ion chromatographic analysis uses standard anion conditions.

Another procedure employs the use of fluoride distillation with a titrimetric finish. Fluorides are converted into fluorosilicic acid ($H_2SiF_6$) by reaction with quartz in phosphoric acid medium, and distilled as such using super heated steam. This is the Willard-Winter-Tananaev distillation. It should be noted that the use of super heated, dry (rather than wet) steam is crucial in obtaining accurate results. Using a wet steam generator yielded results 10–20% lower. The collected fluorosilicic acid is titrated with standardized sodium hydroxide solution. A correction has to be made for the phosphoric acid which is also transferred by the steam. Fluoride data are reported on an ignition-loss-free-basis after determination of ignition loss on a sample heated to 400 degree C. for 1 hour.

The present invention is also directed to a wax isomerization process for producing high yields of non-conventional lube oil base stocks or blending stocks of low pour and high viscosity index which process employs a catalyst prepared by a process involving depositing a hydrogenation metal on an alumina or material containing alumina support, preferably alumina or material which is predominantly alumina (i.e. >50% alumina), calcining said metal loaded support typically at between 350° to 500° C., preferably about 450° to 500° C. for about 1 to 5 hrs, preferably about 1 to 3 hrs and fluoriding said metal loaded support by using either a high pH fluorine source solution, said solution being at a pH of 3.5 to 4.5, to a bulk fluorine level of about 8 wt% or less, (i.e. 2 to 8 wt%) preferably about 7 wt% or less followed by rapid drying in a thin bed or rotary kiln in air, an oxygen containing atmosphere or inert atmosphere to a temperature between about 350° to 450° C. in about 3 hours or less, preferably 375° to 400° C. and holding, if necessary, at the final temperature for a time sufficient to reduce the hydrate content to the aforesaid level (e.g., 1 to 5 hours) or by using a low pH source solution having a pH of less than 3.5 using e.g. aqueous solution of HF or appropriate mixtures of HF and $NH_4F$ to fluoride the support to a bulk fluorine level of about 10 wt% or less, (i.e. 2 to 10 wt%) preferably about 8 wt% or less followed by drying in a thin bed or rotary kiln in air, an oxygen containing atmosphere, or an inert atmosphere to a temperature of about 350° to 450° C., preferably 375° to 425° C. The material can be held at this final temperature for 1 to 5 hours if desired.

The support is preferably in the form of extrudates which are at least about 1/32 inch across the longest cross-sectional dimension. Such extrudates can take the form of tri-lobes, rings, etc., preferably about 1/32 to ¼ inch cylinders, most preferably about 1/16 to ⅛ inch cylinders. The support is preferably alumina or material consisting predominantly (i.e. >50%) of alumina, the alumina preferably being gamma or eta alumina. Typically useful aluminas have surface areas in the range of about 10 to 250 $m^2/g$, preferably about 100 to 250 $m^2$/gram.

The catalyst typically contains from 0.1 to 5.0 weight percent metal, preferably 0.1 to 1.0 weight percent metal, most preferably 0.2 to 0.6 weight percent metal.

The catalysts used in the present isomerization process and which have been found to produce high yields of isomerate are the subject of copending application U.S. Ser. No. 283,709 filed even date herewith, which is a continuation-in-part of U.S. Ser. No. 134,795, filed Dec. 18, 1987 in the names of Cody, Hamner, Sawyer and Davis.

As previously stated, catalysts useful in the present process have been made by fluoriding the metal-loaded support using a high pH solution. The fluorine source solution has a pH of 3.5 to 4.5, and preferably is a solution consisting of HF in combination with NH$_4$F, the amount of ammonium fluoride used being such that the resulting solution has a pH in the above-recited range.

Following deposition of the metal and the fluorine on the support, the catalyst is dried and heated in an air or oxygen containing atmosphere or inert atmosphere to achieve the desired hydrate level. This heating is also responsible for reducing the nitrogen content of the catalyst to the desired level. Heating of the catalyst made using the NH$_4$F/HF source solution is preferably practiced in a thin bed or rotary kiln to insure rapid (i.e. 3 hours or less) thorough even heating to a temperature in the range 350° to 450° C., preferably 375° to 400° C., and holding, if necessary, at the final temperature for a time sufficient to reduce the hydrate and nitrogen contents to the aforesaid levels (e.g. about 1.5 hours). To facilitate removal of nitrogen, it is preferred that the drying/heating be performed in a flowing air, or an oxygen atmosphere or an inert atmosphere preferably in a rotary kiln.

The catalyst has a surface nitrogen content of about 0.01 or less N/Al by x-ray photoelectron spectroscopy (XPS), preferably about 0.007 N/Al or less N/Al, most preferably about 0.004 N/Al or less (by XPS).

Alternatively, the metal-loaded support is fluorided using low pH solutions, pH less than 3.5 using aqueous HF or appropriate mixtures of HF and NH$_4$F, followed by heating in air or oxygen containing atmosphere or hydrogen or an inert atmosphere at a temperature of about 350° to 450° C., preferably about 375° to 425° C. The material can be held at this temperature for from 1 to 5 hours if desired.

If the low pH prepared catalyst is first charged to a unit, the catalyst must be held at the final activation temperature for longer than 5 hours, preferably longer than 10 hours and preferably at temperatures of 400° to 450° C.

The catalyst following the above recited heating can be charged to the isomerization reactor and brought quickly up to operating conditions in a flow of hydrogen. Alternatively the catalyst following the recited heating can be activated preferably in pure or plant hydrogen (about 60 to 70 vol% H$_2$). When activating a catalyst prepared using the high pH solution technique care must be taken to employ short activation times, from 1 to 24 hours, preferably 2 to 10 hours being sufficient at temperatures of 350° to 450° C. Catalysts made using the low pH solution technique can be activated in hydrogen at 350° to 500° C. for from 1 to 48 hours or longer. If low pH prepared catalysts are not heated first then it is preferred that they be subsequently activated at more severe conditions, i.e. for longer times and/or higher temperatures. On the other hand, if they are heated first then moderate activation procedures can be employed, similar to those used for the higher pH solution treatment catalysts.

A typical hydrogen activation profile shows a period of 2 hours to go from room temperature to 100° C. with the catalyst being held at 100° C. for 0 to 2 hours, then the temperature is raised from 100° C. to about 350° C. to 450° C. over a period of 1 to 3 hours with a hold at the final temperature of from 1 to 4 hours. Alternatively, the catalyst can be activated by heating from room temperature to the final temperature of 350° to 450° C. over a period of 2 to 7 hours with a hold at the final temperature of 0 to 4 hours. Similarly, activation can be accomplished by going from room temperature to the final temperature of 350° to 450° C. in 1 hour.

The wax feed may come from any of a number of sources, including waxes recovered from the solvent or autorefrigerative dewaxing of conventional hydrocarbon oils, as well as mixtures of these waxes from different gas oil or deasphalted residue fractions. Waxes from dewaxing conventional hydrocarbon oils are commonly called slack waxes and usually contain an appreciable amount of oil. The oil content of these slack waxes can range anywhere from 0 to 45 percent or more, usually 5 to 30 percent oil. For the purposes of this application, the waxes are divided into two categories: (1) light paraffinic waxes boiling in the range about 300° to 580° C.; and (2) heavy microwaxes having a substantial fraction ($>50$ percent) boiling above 600° C.

As one would expect, isomerization catalysts are extremely susceptible to deactivation by the presence of heteroatom compounds (i.e., N or S compounds) in the wax feed, so care must be exercised to remove such heteroatom materials from the wax feed charges. Waxes obtained from natural petroleum sources contain appreciable quantities of oil which contain heteroatom compounds. In such instances, the slack waxes should be hydrotreated to reduce the level of heteroatoms to levels commonly accepted in the industry as tolerable for feeds to be exposed to isomerization catalysts. Such levels will typically be a nitrogen content of $<1$ to 5 ppm and a sulfur content of $<1$ to 20 ppm, preferably 2 ppm or less nitrogen, and $<1$ to 2 ppm sulfur. Similarly, slack waxes from the heavier feeds should be deoiled prior to hydrotreating to an oil content in the range of 5 to 35 percent oil, preferably 5 to 25 percent oil. The hydrotreating step will employ typical hydrotreating catalyst such as Co/Mo, Ni/Mo or CoNiMo on alumina under standard, commercially accepted conditions, e.g. temperature of 280° to 400° C., space velocity of 0.1 to 2.0 V/V/hr, pressure of from 500 to 3,000 psig H$_2$ and hydrogen gas rates of from 500 to 5,000 SCF/B.

Isomerization is conducted under conditions of temperatures between about 270° to 400° C., preferably 300° to 360° C., pressures of 500 to 3,000 psi H$_2$, preferably 1,000 to 1,500 psi H$_2$, hydrogen gas rates of 1,000 to 10,000 SCF/bbl, and a space velocity in the range of 0.1 to 10 V/V/hr, preferably 1 to 2 V/V/hr.

As is taught in copending application, U.S. Ser. No. 283,664 filed even date herewith, which is a continuation-in-part of U.S. Ser. No. 135,150, filed Dec. 18, 1987 in the names of Cody, Bell, West, Wachter and Achia, it is preferred that the isomerization reaction be conducted to a level of conversion such that about 40 percent and less, preferably 15 to 35 percent, most preferably 20 to 30 percent, unconverted wax remains in the fraction of the isomerate sent to the dewaxing unit calculated as (unconverted wax)/(unconverted wax+dewaxed oil). The amount of unconverted wax in the 370° C.+ oil fraction is taken to be the amount of wax removed or recovered from said oil fraction upon dewaxing. The total product from the isomerization (isom) unit is fractionated into a lube oil fraction boiling in the 330° C.+ range, preferably in the 370° C.+ range. This lube oil fraction is solvent dewaxed, preferably using 20/80 v/v/mixture of MEK/MIBK solvent, and (unconverted) wax is recycled to the isomerization unit.

Operating the isomerization unit at a level of conversion such that the oil fraction sent to the dewaxer contains about 40 percent and less wax, preferably 15 to 35 percent wax, most preferably 20 to 30 percent unconverted wax, goes against the conventional wisdom of isomerization operations. Lower levels of conversion, i.e. those levels at which a substantial portion of wax remains unconverted in the lube oil fraction sent to the dewaxer (and is subsequently recovered at the dewaxer for recycle), are typically seen as favoring maximization of lube oil production since operation at lower levels of conversion tend to favor the production of lube oil as compared to lower boiling fuels. The amount of wax present in the oil sent to the dewaxer normally should have no significant impact on the dewaxability of the oil or the pour point which can be achieved. While there may be a point beyond which so much wax is present as to be beyond the ability of the dewaxer to handle the volume of waxy oil, this traditionally is a materials-handling problem and does not effect the ability of the dewaxer to dewax oil to the desired pour point using conventional dewaxing techniques and temperatures. High levels of wax conversion, however, tend to produce larger quantities of fuels.

Copending application, U.S. Ser. No. 283,664 also reports the discovery that at low levels of conversion difficulty is encountered in producing a lube oil having a pour point of at least $-21°$ C. from wax isomerate employing standard, conventional dewaxing procedures without resorting to "deep dewaxing" techniques. To produce a lube oil fraction which can be easily dewaxed to a pour point of at least $-21°$ C. it has been found that the isomerization unit should be run at a level of wax conversion such that about 40 percent and less, preferably 15 to 35 percent, most preferably 20 to 30 percent, unconverted wax is in the lube fraction sent to the dewaxer.

Following isomerization the isomerate is fractionated into a lubes cut and fuels cut, the lubes cut being identified as that fraction boiling in the 330° C.+ range, preferably the 370° C.+ range. This lubes fraction is then dewaxed to a pour point of about $-21°$ C. or lower. Dewaxing is accomplished by techniques which permit the recovery of unconverted wax, since in the process of the present invention this unconverted wax is recycled to the isomerization unit. It is preferred that this recycle wax be recycled to the main wax reservoir and be passed through the hydrotreating unit to remove any low quantities of entrained dewaxing solvent, which solvent could be detrimental to the isomerization catalyst. Alternatively, a separate stripper can be used to remove entrained dewaxing solvent or other contaminants. In either case the unconverted wax is recycled to the isomerization reactor. Solvent dewaxing is utilized and employs typical dewaxing solvents such as $C_3$ to $C_6$ ketones (e.g. methyl ethyl ketone, methyl isobutyl ketone and mixtures thereof), aromatic hydrocarbons (e.g. toluene), mixtures of ketones and aromatics (e.g. MEK/toluene) liquid, normally gaseous autorefrigerative hydrocarbons such as $C_3$-$C_4$ (i.e. propane, butane, mixtures thereof etc.), etc. at filter temperatures of $-25°$ to $-30°$ C.

As also taught in copending application, U.S. Ser. No. 283,664, the preferred solvent to dewax the isomerate under miscible conditions is a mixture of MEK/MIBK (20/80) used at a temperature in the range $-25°$ to $-30°$ C. Further, when dewaxing isomerate made from a microwax, e.g. Bright Stock slack wax, it has been found to be preferred that the fraction of the isomerate which is dewaxed is the "broad heart cut" identified as the fraction boiling between about 300° to 600° C., preferably 370° to 600° C. The heavy bottoms fraction (600° C.+) contains appreciable wax so they can also be recycled to the isomerization unit.

One desiring to maximize the production of lube oil having a viscosity in the 5.6 to 5.9 cSt/100° C. range should practice the isomerization process under low hydrogen treat gas rate conditions, treat gas rates on the order of 500 to 5000 SCF/bbl, $H_2$, preferably 2000 to 4000 SCF/bbl, $H_2$, most preferably about 2000 to 3000 SCF/bbl, $H_2$, as is taught in copending application U.S. Ser. No. 283,684 filed even date herewith, which is a continuation-in-part of U.S. Ser. No. 134,998 filed Dec. 18, 1987 in the name of H. A. Boucher.

It has also been found that prior to fractionation of the isomerate into various cuts and dewaxing said cuts the total liquid product (TLP) from the isomerization unit can be advantageously treated in a second stage at mild conditions using the isomerization catalyst or simply noble Group VIII on alumina catalyst to reduce PNA and other contaminants in the isomerate and thus yield an oil of improved daylight stability. This aspect is covered in copending application, U.S. Ser. No. 283,659 filed even date herewith, which is a continuation-in-part of U.S. Ser. No. 135,149, filed Dec. 18, 1987 in the names of Cody, MacDonald, Eadie and Hamner.

In that embodiment the total isomerate is passed over a charge of the isomerization catalyst or over just a noble Group VIII metal on alumina catalyst. Mild conditions are used, e.g. a temperature in the range of about 170° to 270° C., preferably about 180° to 220° C., at pressures of about 300 to 1,500 psi $H_2$, preferably 500 to 1,000 psi $H_2$, a hydrogen gas rate of about 500 to 10,000 SCF/bbl, preferably 1,000 to 5,000 SCF/bbl and a flow velocity of about 0.25 to 10 V/V/hr, preferably about 1 to 4 V/V/hr. Higher temperatures may be employed if pressures in excess of 1,500 psi are used, but such high pressures may not be practical.

The total isomerate can be treated under these mild conditions in a separate, dedicated unit or the TLP from the isomerization reactor can be stored in tankage and subsequently passed through the aforementioned isomerization reactor under said mild conditions. It has been found to be unnecessary to fractionate the first stage product prior to this mild second stage treatment. Subjecting the whole product to this mild second stage treatment produces an oil product which upon subsequent fractionation and dewaxing yields a base oil exhibiting a high level of daylight stability and oxidation stability.

The invention will be better understood by reference to the following examples which either demonstrate the invention or are offered for comparison purposes.

EXAMPLES

Example 1

In the following runs the isomerate was made from slack wax obtained by solvent dewaxing a 600N oil. The slack wax was hydrotreated over two commercial catalyst: HDN-30 catalyst at 350° C., 1.0 V/V/hr, 1,500 SCF/bbl, $H_2$, 1,000 psi $H_2$ and over KF-840 at 340° C., 0.5 V/V/hr, 1,000 psi, 1,500 SCF/bbl, yielding 98 percent hydroprocessed wax. These hydrotreated waxes had oil contents ranging from 21 to 23 percent, sulfur ranging from 3 to 10 (ppm), and nitrogen of ≦1 (ppm).

A blend of the hydrotreated wax feed was contacted with platinum on fluorided alumina catalysts produced in the following way:

Catalyst 1

One sixteenth inch calcined platinum γ alumina extrudates were obtained from the commercial supplier containing 0.6 weight percent platinum and 1 percent chlorine. The method loaded extrudate was then fluorided using 5:1 volume excess of 10 percent aqueous HF by immersion for 16 hours at ambient temperature (~25° C.). The resulting material when washed with 2-fold excess $H_2O$ and dried at about 120° C. in vacuum for 16 hours was designated Catalyst 1. The fluoride content was 7.2 weight percent. Catalyst 1 was activated at atmospheric pressure in $H_2$ as follows: heating from room temperature to 343° C. in 4 hours, hold at 343° C. for 2 hour.

Catalyst 2

This catalyst was prepared using 1/16 inch calcined platinum-γ alumina extrudates obtained from a commercial supplier. The extrudates contained 0.6 wt% platinum and 1% chlorine. The metal loaded extrudate was fluorided using 5:1 volume excess of 11.6 wt% aqueous HF by immersion for 16 hrs at about 25° C. The resulting material was washed with a 2 fold excess $H_2O$ and dried at about 120° C. in vacuum for 16 hrs after which it was heated at 400° C. in air for 3 hours. The heated material, Catalyst 2 was charged to a small pilot unit and activated in atmospheric pressure $H_2$ by heating from room temperature to 343° C. in 4 hrs, and holding at 343° C. for 2 hrs.

TABLE I

| Catalyst | 1 | 2 |
|---|---|---|
| Catalyst Property | | |
| N/Al by XPS* | 0.0012 | 0.0013 |
| Hydrate Level* | 66 | 57 |
| Cat Charge (cc) | 50 | 50 |
| F wt % (bulk) | 7.2 | 7.2 |
| F wt % (surface) | 0.43 | ** |
| Isom Conditions | | |
| Temperature, °C. | 313 | 315 |
| Pressure psi $H_2$ | 1,000 | 995 |
| LHSV (v/v/h) | 0.45 | 0.45 |
| Gas Rate (SCF/bbl,$H_2$) | 5,000 | 5,000 |
| Max 370° C.+ oil yield (wt. % on feed) | 47.1 | 51.7 |
| 370° C.− conversion | 36.1 | 18.7 |

*after activation
**It is believed that the surface fluorine content of catalyst 2 is the same as for catalyst 1 as it has been found that heating in air normally has little effect on surface fluorine levels provided the catalyst was fluorided at low pH (<4).

The only difference between catalyst 1 and catalyst 2 was that catalyst 2 had been heated in air at 400° C. for 1 hr. This treatment resulted in a reduction of the hydrate level to about 60. Catalyst 1 possessed a hydrate level in excess of 60. As can be seen in Table 1 catalyst 2 produced a higher yield of oil boiling in the 370° C.+ range as compared to the yield obtained using catalyst 1.

Example 2

In this Example the hydrotreated 600N slack wax feed is that previously described in Example 1. Following isomerization in an upflow once-through mode of operation, the isomerate was fractionated into a 370° C.+ (lube fraction).

Dewaxed oil yields were determined using the ASTM Test D-3235 on the 370° C.+ fraction. The results shown in Table II illustrate that the $NH_4F$/HF treated catalysts exhibit good dewaxed oil yields provided surface fluorine is low, the hydrogen activation procedure is not protracted and the hydrate levels are within the previously recited desirable range.

A series of catalysts was prepared using $NH_4F$/HF by soaking commercial 1/16 inch calcined alumina extrudates containing 0.6 weight percent platinum and about 1.0 percent chlorine with a solution of $NH_4F$/HF having a pH of about 4. The soaked material was washed, then dried and heated (as indicated in Table II). Fluorine content (bulk and surface), surface nitrogen to aluminum ratio (N/Al by XPS), hydrate level and activation procedures are as given in the Table II. Only Catalysts 3 and 4 which have low surface fluorine concentrations (i.e. <2% fluorine at the surface of the formed particle) are found to be adequately selective. Each of the comparison catalysts have high surface fluorine levels. Comparison Catalyst 3 which was activated over a very long period of time, and which was judged initially (before charging to the unit) to be within the scope of the invention subsequently did not exhibit good selectivity. We believe the severe activation conditions to be responsible for subsequently increasing the surface fluorine level thereby impairing selectivity.

TABLE II

| | 3 | 4 | Comparison 1 | Comparison 2 | Comparison 3 | Comparison 4 |
|---|---|---|---|---|---|---|
| Catalyst Charge (cc) | 200 | 200 | 200 | 200 | 200 | 200 |
| Fluoride Source Solution | $NH_4F$/HF | $NH_4F$/HF | $NH_4F$/HF | $NH_4F$/HF | $NH_4F$/HF | $NH_4F$/HF |
| Drying/heating conditions, °C. (in air) | 400 (muffle) | 400 (rotary kiln) | 400 (rotary kiln) | 400 (muffle) | 400 (rotary kiln) | 400 (muffle) |
| Inspection on Dried/heated catalyst | | | | | | |
| N/Al by XPS | 0.0037 | 0.0021 | 0.010 | 0.013 | 0.0021 | 0.0040 |
| F, wt % (bulk) | 7.0 | 7.0 | 6.8 | 5.6 | 7.0 | 6.9 |
| F, wt % (surface) | 1.7 | 2.0 | ~10 | ~5 | *— | 7 |
| Hydrate Level (after drying/heating) | 29 | 24 | 39 | <10 | 24 | <10 |
| Hydrogen Activation | | | | | | |
| Activation Times, hrs Rt to 100° C., @ 100° C. | 2, 1 | — | 2, 1 | 2, 1 | 3, 6 | 2, 1 |

TABLE II-continued

|  | 3 | 4 | Comparison 1 | Comparison 2 | Comparison 3 | Comparison 4 |
|---|---|---|---|---|---|---|
| To Final Temp. (T) | 3 | 7(2) | 2 | 2 | 42 | 2 |
| Time at T | 4 | 2 | 1 | 1 | 3 | 1 |
| Final T, °C. | 450 | 350 | 350 | 350 | 400 | 350 |
| Activation Pressure, psi $H_2$ | 50 | 50 | 50 | 50 | 300 | 50 |
| Isom Conditions |  |  |  |  |  |  |
| Temp., °C. | 340 | 309 | 310 | 300 | 305 | 310 |
| LHSV (v/v/h) | 0.90 | 1.0 | 0.90 | 0.90 | 1.0 | 0.90 |
| Pressure, psi $H_2$ | 1,000 | 1,000 | 1,000 | 1,000 | 1,000 | 1,000 |
| Gas Rate (SCF/b, $H_2$) | 5,000 | 5,000 | 5,000 | 5,000 | 5,000 | 5,000 |
| Dewaxed oil yield, 370° C.+ (wt % on feed)[1] | 50.0 | 49.3 | 44.0 | 45.0 | 45.0 | 48.5 |
| 370° C.−, conversion (wt % on feed) | 23.8 | 35.2 | 26.1 | 24.1 | 21.8 | 30.1 |
| Unconverted wax (wt % on feed) | 26.2 | 15.5 | 29.6 | 30.9 | 33.2 | 21.4 |

[1] Oil yields reported by ASTM-3235 method.
[2] Rt to 350° C. in 7 hours.
*Fluorine at surface measured to be 2.0 before activation and approximately 7 after activation.

What is claimed is:

1. An improved method for producing lube oil base stocks or blending stocks by the catalytic isomerization of wax under typical isomerization conditions, said improvements comprising using a hydrogenation metal loaded fluorided alumina or material containing alumina catalyst which catalyst as introduced to waxy feed is characterized by possessing (1) a hydrate level of 60 or less determined as the relative amount of hydrate represented by a peak in the X-ray diffraction (XRD) pattern at $2\theta=5.66$ Å when a hydrate level of 100 corresponds to the $2\theta=5.66$ Å peak height exhibited in the XRD by a standard material constituting 0.6 wt% Pt on 150 m²/g γ alumina containing 7.2 wt% fluorine wherein the fluorine has been deposited using an aqueous solution containing a high concentration of HF and the material dried at 150° C. for 16 hours; (2) a surface nitrogen content N/Al ratio of 0.01 or less as determined by X-ray photo electron spectroscopy; (3) a bulk fluorine concentration of between 2 to 10 wt% and (4) a surface fluorine concentration defined as the amount of fluorine present in a layer between the surface of the catalyst to a depth of about 1/100 inch of less than about 3 wt% provided that the surface fluoride concentration is less than the bulk fluoride concentration.

2. The method of claim 1 wherein the catalyst possesses a hydrate level of between 10 to 60.

3. The method of claim 1 wherein the catalyst possess a surface nitrogen content N/Al ratio of 0.007 or less.

4. The method of claim 1 wherein the catalyst possesses a hydrate level of between 10 to 60 and a surface fluorine content of less than about 1 wt%.

5. The method of claim 4 wherein the catalyst possesses a surface fluorine content of less than about 0.5 wt%.

6. An improved method for producing lube oil base stock or blending stocks by the catalytic isomerization of wax under standard isomerization conditions, said improvement comprising using a hydrogenation metal loaded fluorided alumina or material containing alumina catalyst made by the process involving depositing the hydrogenation metal on the support, calcining said metal loaded support, fluoriding said metal loaded support using a fluorine source solution at a pH of 3.5 to 4.5 to a bulk fluorine level of about 8 wt% or less and drying/heating said fluorided metal loaded support to a temperature between 350° to 450° C. in air, an oxygen containing atmosphere, or an inert atmosphere in about 3 hours or less.

7. The method of claim 5 wherein the halogen source solution is an aqueous solution of $NH_4F/HF$.

8. The method of claim 6 or 7 wherein the support is gamma alumina.

9. An improved method for producing lube oil base stock or blending stock by the catalytic isomerization of wax under standard isomerization conditions, said improvement comprising using a hydrogenation metal loaded fluorided alumina or material containing alumina catalyst made by the process of depositing the hydrogenation metal on the support, calcining said metal loaded support, fluoriding said metal loaded support using a fluorine source solution having a pH of less than 3.5 to a bulk fluorine level of about 10 wt% or less and drying/heating said fluorided metal loaded support at a temperature between 350° to 450° C. in air, an oxygen containing atmosphere, hydrogen or an inert atmosphere.

10. The method of claim 9 wherein the fluorine source solution is an aqueous solution of HF.

11. The method of claim 9 or 10 wherein the fluorided metal loaded support is dried/heated at a temperature between 375° to 425° C.

12. The method of claim 9 or 10 wherein the support is gamma alumina.

* * * * *